US007145656B2

(12) United States Patent
Rodrigues et al.

(10) Patent No.: US 7,145,656 B2
(45) Date of Patent: Dec. 5, 2006

(54) COMPUTER-IMPLEMENTED METHOD FOR MATCHING PAINT

(75) Inventors: Allan Blase Joseph Rodrigues, Bloomfield Hills, MI (US); Daniel A. Benton, Newark, DE (US); Gerard T. Brosmer, Wilmington, DE (US); Catherine A. Marchand, Wilmington, DE (US); Larry Eugene Steenhoek, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 372 days.

(21) Appl. No.: 10/737,250

(22) Filed: Dec. 15, 2003

(65) Prior Publication Data

US 2005/0128484 A1  Jun. 16, 2005

(51) Int. Cl.
*G01J 3/46* (2006.01)
(52) U.S. Cl. .................... 356/402; 356/421
(58) Field of Classification Search ............... 356/402, 356/421
See application file for complete search history.

(56) References Cited

U.S. PATENT DOCUMENTS

| | | | |
|---|---|---|---|
| 4,751,535 A | 6/1988 | Myers | |
| 5,172,224 A | 12/1992 | Collette et al. | |
| 5,237,517 A | 8/1993 | Harrington et al. | |
| 5,371,599 A | 12/1994 | Falcoff et al. | |
| 6,014,221 A | 1/2000 | Plude, Jr. | |
| 6,293,284 B1 | 9/2001 | Rigg | |
| 6,539,325 B1 | 3/2003 | Numata et al. | |
| 6,563,510 B1 * | 5/2003 | Rice et al. | 345/593 |
| 6,618,050 B1 | 9/2003 | Rupieper et al. | |
| 6,914,613 B1 * | 7/2005 | Marchand et al. | 345/593 |
| 2001/0036309 A1 | 11/2001 | Hirayama et al. | |
| 2002/0106121 A1 | 8/2002 | McClanahan | |
| 2002/0184168 A1 | 12/2002 | McClanahan et al. | |
| 2003/0163262 A1 | 8/2003 | Corrigan et al. | |
| 2003/0174143 A1 | 9/2003 | Rice et al. | |

FOREIGN PATENT DOCUMENTS

| | | |
|---|---|---|
| EP | 1 139 234 A1 | 10/2001 |
| GB | 2 058 387 A | 4/1981 |
| JP | 10323612 A | 12/1998 |
| WO | WO 02/12847 A1 | 2/2002 |

OTHER PUBLICATIONS

U.S. Appl. No. 60/625,559, filed Nov. 5, 2004, Rodrigues.
C. S. Haase and G. W. Meyer, "Modeling Pigmented Materials for Realistic Image Synthesis", ACM Transactions on Graphics, vol. 11, No. 4, Oct. 1992, pp. 305-335.
H. B. Westlund and G. W. Meyers, "Applying Appearance Standards to Light Reflection Models", Department of Computer and Information Science, University of Oregon, Aug. 2001.

* cited by examiner

*Primary Examiner*—F. L. Evans
(74) *Attorney, Agent, or Firm*—Chyrrea J. Sebree

(57) ABSTRACT

The present invention is directed a computer-implemented method for determining a color matched repair paint formula, wherein color characteristics of a target color to be matched are identified, inputted, and processed in such way as to enable a visual display of the target color, then alternate color(s) is/are selected from a color database based upon color characteristics of the target color to be matched, then subsequently processed and visually displayed thus enabling comparison of the alternate color(s) with the target color; and finally, a desired alternate color is selected and a formulation determined thereof. Further, the target color may be superimposed over an image of a vehicle to be repaired, and alternate candidate may even be superimposed over the target color in the area of the vehicle to be repaired, in order to assist the user with selecting the best match.

16 Claims, 2 Drawing Sheets

COMPUTER-IMPLEMENTED METHOD FOR MATCHING PAINT

BACKGROUND OF THE INVENTION

The present invention is directed to a method for matching paint, more particularly, the invention is directed to a computer-implemented method for matching paint on vehicles which utilizes a video monitor display to assist the user in selecting an optimally matched color coating.

Vehicle paint color variability within the same target color can exist due to slight variations in the color of the paint formulations or application conditions used by the original equipment manufacturers (OEM). These variations may occur from one manufacturing location to another manufacturing location, or from one production run to another of a given color on the same vehicle model, or even during the course of a particular production run. Although these differences may be unnoticeable on separate vehicles, when they are present on adjacent body panels of the same vehicle, the differences can be visibly perceptible. These color variations make it difficult to attain excellent color matching in autobody repair shops.

When a car body is repaired, the repair area must be repainted. The color of the repair must match that of the rest of the car such that the repair area is not distinguishable to the observer. The refinish paint is often not a close enough color match since, within a given color code, color generally varies from one car to the next, or even from one part of a car to another. The finisher must then adjust the color of the paint by adding small amounts of colored tints, which in many instances requires the finisher to make several iterations to close in on an acceptable match. A number of methods have been devised to automate the process of paint matching. A typical method uses a device (e.g., a spectrophotometer) that measures color characteristics of the painted surface, and matches the measurements to those archived in a computer database associated with paint formulas. In this method, the computer database is located at the repair facility. The paint formulas are then used to prepare a paint, which is then applied to a test panel and compared to the original paint on the vehicle. Typically, the paint formula is not an adequate match and must be manually adjusted until a match is obtained. This rather inefficient process significantly affects labor cost of a finishing procedure.

Another traditional approach has been to provide color chips of all colors and alternates available. A color chip is simply a color coated panel, which represents an available paint or color formulation. The finisher may then select a target color range, and select a best matched paint formulation from a library of color chips. Unfortunately, this approach is very expensive for the paint suppliers as customers do not expect to pay for the color chips. Also, due to variations in the color chip preparation process, color chips sometimes differ in color properties from the actual target color sprayed by the user.

Yet another approach are spectrophotometer based color matching systems (e.g., DuPont ChromaVision®). These systems measure the color being matched and calculate a formula to provide a color match. These systems, however, do not provide an accurate visual display of the color match. Addition of such a display would allow the painter to have greater confidence in the match. Also, as these systems are generally expensive, many users are not willing to pay such a high price.

Given these typical situations, vehicle repair body shops and jobbers must make choices of colors or alternates to get the right color on vehicles being painted. Since they likely relate well to visual displays of colors and alternates, offering a method of using a computer both to calculate and display color alternate choices would simplify the color matching process and make it more effective from a customer usage point of view. Such a method of displaying colors would also assist OEM (Original Equipment Manufacturer) customers when making vehicle styling choices. Therefore, there is a need for computer-implemented methods, which utilize on-screen video monitor displays to assist the finisher in selecting an optimum color matched color coating.

BRIEF SUMMARY OF THE INVENTION

The present invention is directed a computer-implemented method for determining a color matched repair paint formula, wherein:
  color characteristics of a target color to be matched are identified, inputted, and processed in such way as to enable a visual display of the target color;
  alternate color(s) is/are selected from a color database based upon color characteristics of the target color to be matched, then subsequently processed and visually displayed thus enabling comparison of the alternate color(s) with the target color; and,
  a desired alternate color is selected and a formulation determined thereof.

Further, the target color may be superimposed over an image of a vehicle to be repaired, and alternate candidate may even be superimposed over the target color in the area of the vehicle to be repaired, in order to assist the user with selecting the best match.

DETAILED DESCRIPTION OF THE INVENTION

Figure 1:
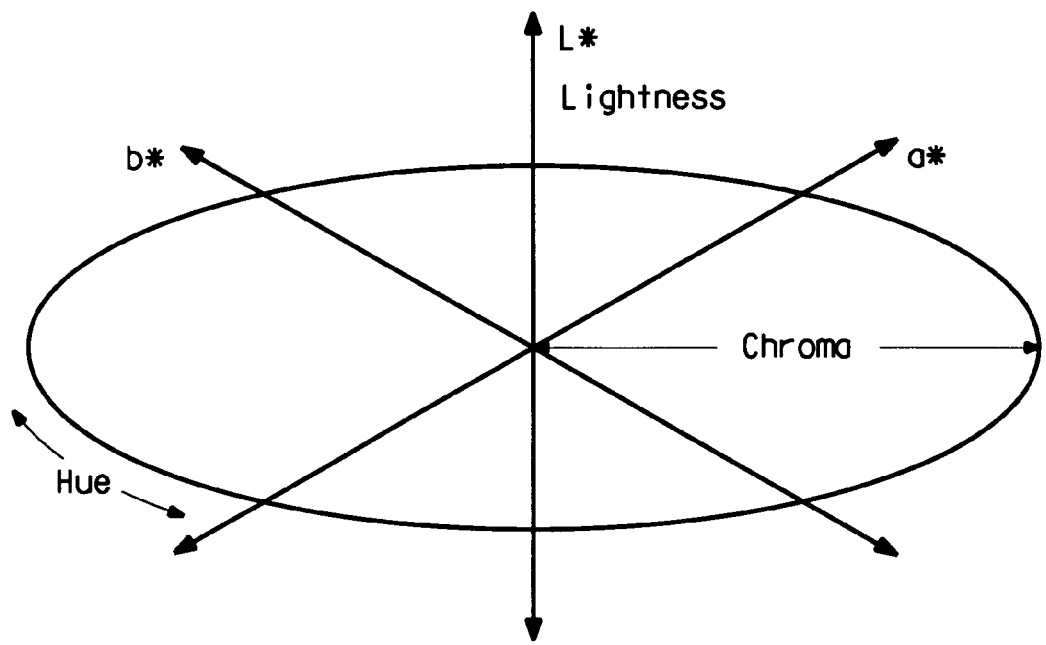
FIG. 1 represents a standard CIE L*a*b* three-dimensional color space.

The method of the present invention comprises the use of a video monitor for display, a computer equipped with a color and appearance database reference, and an apparatus or technique for inputting target color characteristics. This computer-implemented method is useful for simulating a variety of color alternates on a video monitor. By "color alternates", it is meant those alternate repair of refinish paint color coatings available to best match a particular original target colorcoat. Original colorcoats used by a vehicle manufacturer, as previously mentioned are known to often vary in color properties from plant to plant and during different times of the year, and asuch, require development of alternate repair or refinish paint colorcoats to achieve best color matched paint. From these alternates, the user can select that alternate which provides a best match to the target for color and appearance, thus assisting the user in preparing an optimum color matched color coating.

The invention is useful for matching paint, most particularly paint on vehicles. "Vehicle" includes an automobile;

light truck; medium duty truck; semi-truck; tractor; motorcycle; trailer; ATV (all terrain vehicle); pick-up truck or a heavy mover, such as a bulldozer, mobile crane and earth mover; airplanes; boats; ships and other modes of transport that are coated with paint compositions. The invention may also be useful for matching paint in industrial and architectural settings, including buildings equipment, machinery, transportation structures, or color coating compositions applied over wood or cementitious substrate surfaces, and the like.

In computer systems, the digital representation of color is in terms of variable mixes of three basic chrominance colors: red, green and blue (RGB). The human visual system predictably perceives the close juxtaposition of these three basic colors as one resultant color. This illusion is the basis for color image processing. That is, it is possible to manipulate the intensity mix of the three basic constituent colors, red, green, and blue, to cause a viewer to perceive various desired color shades. In fact, a full spectrum of colors may be perceived in this manner.

In present computer graphics systems, red, green, and blue colors are mixed by a graphics controller that usually handles the intensity control of each basic color using a 6–8 bit control—referred to as an intensity value. Generally, the working range of intensity values are from 0 to 255, 0 meaning that the corresponding basic color is completely dark (at 0%) and 225 meaning that the corresponding basic color is at maximum intensity (at 100%). Intensity values between 0 and 255 produce corresponding, but not necessarily, proportional changes in actual displayed brightness for the corresponding color and, thus, corresponding changes in resulting perceived color.

The derivation of the video monitor RGB values from tristimulus data X, Y, & Z is made from known mathematical calculations, based upon color characteristics. Conversion from X, Y, & Z tristimulus data to RGB takes the form of a simple matrix transformation.

$$\begin{bmatrix} R \\ G \\ B \end{bmatrix} = \begin{bmatrix} 3.24079 & -1.537150 & -0.498535 \\ -0.969256 & 1.875992 & 0.041556 \\ 0.055648 & -0.204043 & 1.507311 \end{bmatrix} * \begin{bmatrix} X \\ Y \\ Z \end{bmatrix}$$

and the inverse transform simply uses the inverse matrix:

$$\begin{bmatrix} X \\ Y \\ Z \end{bmatrix} = \begin{bmatrix} 3.24079 & -1.537150 & -0.498535 \\ -0.969256 & 1.875992 & 0.041556 \\ 0.055648 & -0.204043 & 1.057311 \end{bmatrix}^{-1} * \begin{bmatrix} R \\ G \\ B \end{bmatrix}$$

The color of the paint is described in L*, a* and b* values which are coordinates in visual uniform color space and are related to X, Y & Z tristimulus values by the following equations which have been specified by the International Committee of Illumination:

L* defines the lightness axis $L^* = 116(Y/Yo)^{1/3} - 16$ a* defines the red green axis $a^* = 500[(X/Xo)^{1/3} (Y/Yo)^{1/3}]$ b* defines the yellow blue axis $b^* = 200[(Y/Yo)^{1/3} - (Z/Zo)^{1/3}]$ where
  Xo, Yo and Zo are the tristimulus values of the perfect white for a given illuminant;
  X, Y and Z are the tristimulus values for the color.

It is generally well accepted that the three-dimensional color space can be used to define colors in terms of certain color characteristics or color attributes. CIELAB, also commonly referred to as L*a*b* and Lab, is a uniform device independent color space in which colors are located within a three-dimensional rectangular coordinate system. The three dimensions are lightness (L), redness/greenness (a) and yellowness/blueness (b). Referring to FIG. 1, the axis labeled L* in the figure represents a scale of luminous intensity or degree of lightness attribute. The axis labeled a* represents a scale of red/green appearance and the orthogonal axis b* represents a scale of yellow/blue appearance. The information contained in the combination of a color's a*-b* axes position represents the chromatic attributes known as hue and saturation. The hue varies with the position about the L* axis and the chroma changes with the distance from the L* axis. Therefore, a complete set or group of color attributes, or the attributes' defining coordinates comprising lightness (L*), red/green (a*), and yellow/blue (b*) in the L*a*b* color space, fully defines a color point or locus in the color space. When generally used herein, the term color shall be understood to be fully defined by one or more complete sets or groups of color attributes or corresponding coordinates considering all three dimensions or axes in a three dimensional color space.

Figure 2:
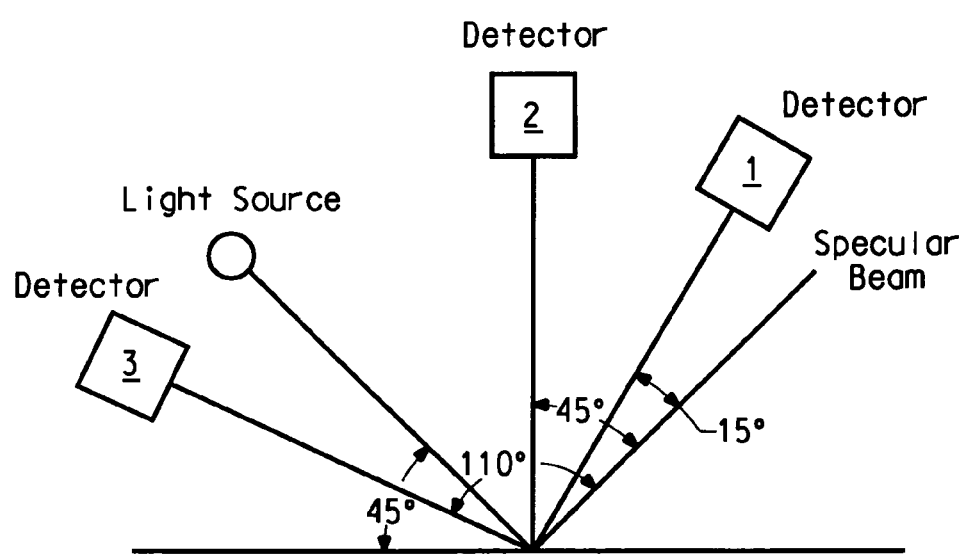
FIG. 2 is a schematic representation of spectrophotometric system and measurement angles.

Color can be further described at a variety of refection angles, $L(\theta)$, $a(\theta)$ and $b(\theta)$, where $\theta$ is the particular reflection angle as measured from the specular direction. Commercial multi-angle calorimeters and spectrophotometers are widely available and are useful in measuring the L*, a* and b* values at several angles in one reading. Typical angles are 15°, 45°, and 110° as measured from the specular angle, as FIG. 2 illustrates.

Figure 3:
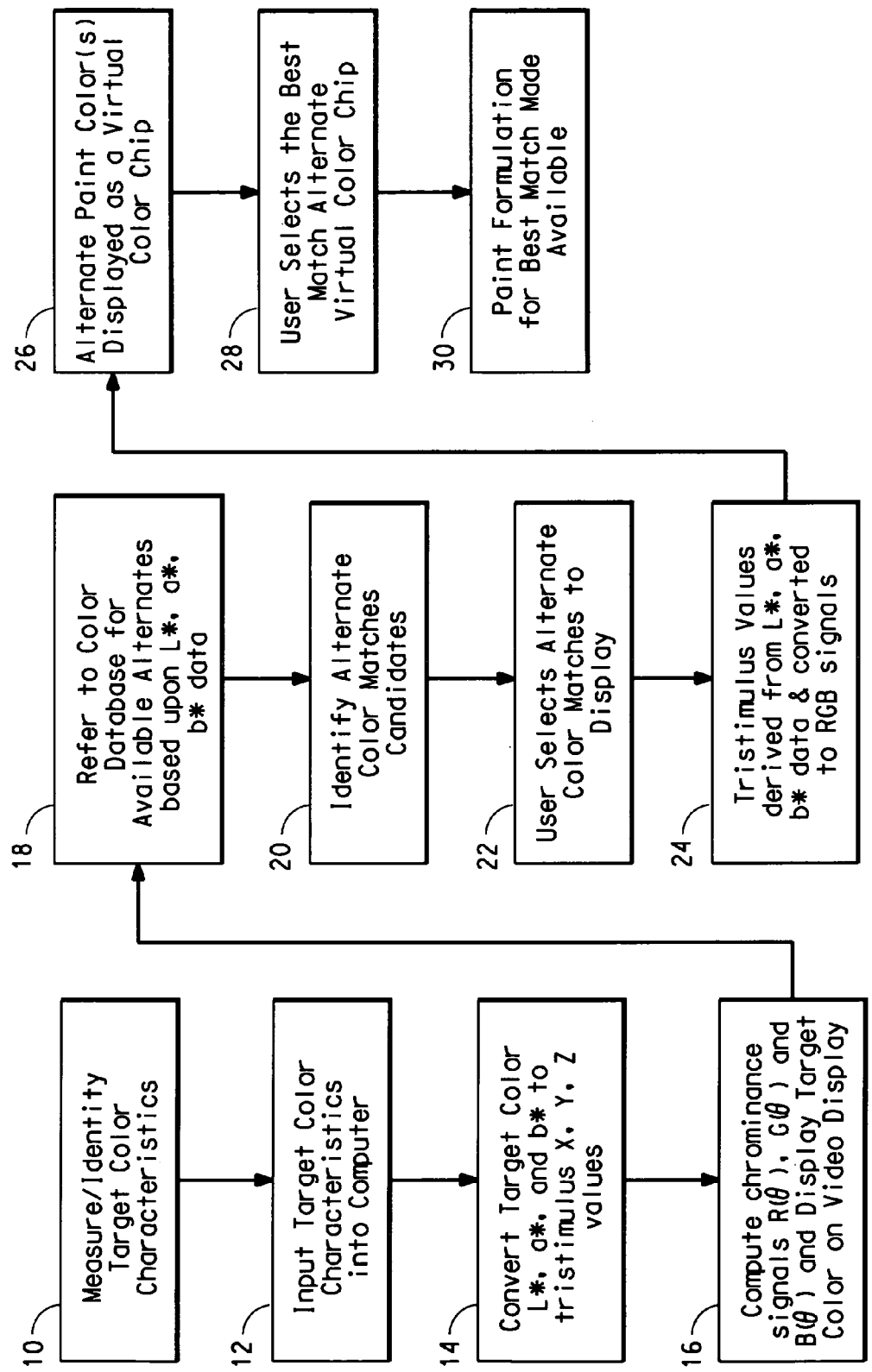
FIG. 3 is a flow chart representation of a preferred method of the present invention

Referring to FIG. 3, a flow diagram which generally illustrates an embodiment of the present invention, in step 10, the color characteristics, or $L(\theta)$, $a(\theta)$ and $b(\theta)$ values, of a targeted color to be matched are measured and/or identified. Color characteristics of the target coating to be matched and repaired may be determined by human visual inspection, or using a calorimeter or spectrophotometer. Preferably, the measurement is made using a multi-angle spectrophotometer, which identifies the color characteristics as part of the instrumental measurement.

If, however, the color characteristics are determined by visual inspection, then the visual user may select a vehicle identification number based color standard chip. The user may then compare the standard chip to the target color, and determine if an offset color is needed based upon any differences in color characteristics (e.g., greener near specular, darker sidetone). The color standard's color characteristics are then selected from a paint formulation database, converted to RGB values, and projected on the video monitor. Further, several offset variations can be selected from the aforementioned paint formulation database, and be comparatively represented, either individually or several, on the monitor. The user may then select an offset paint formulation which best matches the target coating for both color and appearance.

If a calorimeter or spectrophotometer is used in the present invention to identify the color characteristics of a target color to be matched, such a device is not particularly restricted provided that it permits colorimetry at a plurality of viewing angles within the visible region of the spectrum.

The preferred spectrophotometer, however, comprises a docking station, a color measuring unit and a battery which has been built in said color measuring unit and is chargeable during the period in which the color measuring unit set on said docking station remains connected to an external power supply and, as the color measuring unit is re-set on said docking station after the color measurement in its detached condition, is not only capable of transmitting calorimetric data to the computer but also capable of measuring the sample coated plate even while said color measuring unit remaining set on the docking station. The color measuring unit mentioned above is a spectrocolorimetric unit having a measuring head, which can be set on said docking station or disconnected from the station, held with a single hand or both hands and applied against the object of colorimetry. The plurality of viewing angles mentioned above are preferably 15°, 45°, and 110° from the direction of specular reflection, for example when the illumination angle is 45° with the direction normal to the specimen surface. When the measurement of light is possible at those 3 angles, the luster of the metallic or pearlescent pigment can be accurately reflected in the determination. In the case of circular illumination, the illumination is performed at the angles of 15°, 45°, 110°, etc. with respect to the direction normal to the specimen surface and received in said normal direction. Commercially available and useful multi-angle spectrophotometers are available from X-Rite® Incorporated, Grandeville, Mich.

In another embodiment, appearance characteristics of a target color to be matched may be identified in a further step. As used herein, appearance means perception in which the spectral and geometric aspects of a visual stimulus are integrated with its illuminating and viewing environment. Appearance characteristics include spectral, spatial and geometric aspects. Spectral characteristics are those color aspects such as chroma, hue, lightness, darkness, and the like. Geometric and spatial aspects generally include visually perceived features of gonioapparent flakes such as texture, shape, density, coarseness, fineness, stipple, flop, change in color aspects at different viewing angles, and the like. The term flake means a gonioapparent flake, unless otherwise indicated.

Referring again to FIG. 3, at step 12 the color characteristics identified in step 10 are inputted into a computer. The L*, a*, and b* are converted to tristimulus X, Y, Z values, step 14. The chrominance signals R($\theta$), G($\theta$) and B($\theta$) are then computed in such way as to display the targeted color to be matched on a color monitor, step 16.

At step 18 of FIG. 3, a color database is referred to which contains associations between L*, a*, and b* and available paint formulation alternates. Based upon defined color data differences between target color and available alternates, a variety of alternate candidate colors are available to be represented on the video monitor to be compared with the target color. In step 20, alternate candidate matches are identified and made available for visual display on a monitor.

It must be pointed out that in the embodiments of the present invention, in the judgment of color and appearance difference, absolute color and appearance in the monitor are not as important as accurate differences between alternates and the target color.

Referring to FIG. 3 at steps 22, 24, and 26, alternates that are candidate matches are selected by the user, color data converted to chrominance signals, and displayed as virtual color chips on the video monitor. Within step 24, the tristimulus X, Y, Z values of those candidate alternates selected are derived from L*, a*, and b* data, and then converted to chrominance signals R($\theta$), G($\theta$) and B($\theta$). The chrominance signals are used to display alternate paint formula color on a video monitor as a virtual color chip, step 26.

Alternate virtual color chips may be displayed individually or severally. The user chooses the best color match alternate, FIG. 3 step 28. A paint formulation of this best match alternate may then be made available for preparing an optimum color matched color coating.

An alternate virtual color may be displayed on the video monitor screen in several chips, where each chip represents a different viewing angle. Together, these chips would represent gonioapparent appearance characteristics of the alternate. These chips could be viewed individually, or viewed in combination with the target color, and/or other alternates.

The user can use any basis for making a selection of the best match alternate. Selection may be made based upon color data. Also, the user could view the appearance characteristics of the actual vehicle, the target color displayed on the video monitor, and the displayed best match alternate. Further, flake appearance options may be displayed and selected therefrom, as this would be a way of ensuring an effective flake choice.

Preferably, flake appearance options are visually displayed images, which the user may superimpose with "best match" color RGB data, in order to select the best flake appearance. The flake appearance option images are preferably black and white electronic images showing flake appearance characteristics. Also, the image may be sized according to the distance at which the color is viewed and superimposed with the color displayed in the video image. The electronic photograph may be taken at a plurality of aspecular angles and the images interpolated to show the change in flake appearance as the panel is tilted.

Image analysis techniques could be employed as an alternate method of identifying and selecting a best match for flake appearance. In an embodiment, this may be accomplished by capturing an image of the target color and categorizing the image on the basis of the appearance characteristics. Then, the categorized target color image could be compared with a library images in like or similar categories.

In yet another embodiment, in selecting the best alternate, the virtual alternate color chips may be displayed in such way as to observe goniochromatic color differences. Texture and sparkle information observed by this technique could be used to choose the best alternate. The virtual chips could be several rectangular panels or even curved panels which simultaneously displaying several viewing angles, thus showing goniochromatic effects. If the image is a curved panel, the multi-angle color and the flake appearance image are both interpolated to as the aspecular angle changes around the curvature of the panel. Further, the target color and best alternate color, or colors, could be visually displayed simultaneously in several virtual chips. The virtual chips are preferably viewed against a neutral gray surround.

Alternates chosen for display could be based on those available for the particular color stock code of the car being repaired or by scanning the entire database for close color matches. If the latter, the system would allow viewing under at least two light sources to check for metamerism. When judging color under different light sources, the surround gray is determined for the light source being simulated, so that the viewer is chromatically adapted to that light source.

Alternates may be selected, or ruled out, on the basis of metamerism. Simultaneous display of a descriptive version of metamerism index or potential may be made. Metamerism is defined by ASTM E 284 as "the property of two specimens that match under a specified illuminator and to a specified observer and whose spectral reflectance's or transmittances differ in the visible wavelengths". The International Commission on illumination (CIE) has defined equations to calculate the color of a specimen from the spectral reflectance of the specimen, the spectral distribution of the illuminant or light source, and the spectral response of the observer.

While human observers with normal color vision differ somewhat in spectral response, the CIE has defined the response for the average or "standard" observer. The reflectance factors are used to calculate color descriptor values used to specify color and color difference. The tristimulus values (X, Y, Z) of a color are calculated by combining the reflectance factor data (r) with data on the sensitivity of the human eye ($\bar{x}$, $\bar{y}$, $\bar{z}$) and the irradiance of a light source (E) all as functions of wavelength ($\lambda$) in the visible spectrum. The defining equations for tristimulus values are:

$$X = \int \bar{x}(\lambda)E(\lambda)r(\lambda)d(\lambda)$$

$$Y = \int \bar{y}(\lambda)E(\lambda)r(\lambda)d(\lambda)$$

$$Z = \int \bar{z}(\lambda)E(\lambda)r(\lambda)d(\lambda)$$

The tristimulus values can be used to calculate color descriptors which relate to visual perception of color and color difference. One of many sets of descriptors which can be used are the CIELAB perceptual color scales recommended by the International Commission on Illumination ("Recommendations on Uniform Color Spaces, Color Difference Equations, Psychometric Color Terms", Supplement No. 2 To CIE Publication No. 15 (E1.3.1) 1971/CT(1.3) 1978. Bureau Central De La CIE, 52, Boulevard Malesherbes 75008, Paris, France).

The X, Y, Z can be converted to L, a, b using the aforementioned equations. This computation can be done for each of the two paint specimens under two different light sources, typically average daylight and incandescent light. A metamerism index can then be computed as the square root of the sum of the squares of the differences of the color difference between the two specimens under the two light sources.

$$MI = \sqrt{(\Delta L_C - \Delta L_A)^2 + (\Delta a_C - \Delta a_A)^2 + (\Delta b_C - \Delta b_A)^2}$$

where $_C$ refers to average daylight and $_A$ refers to incandescent light.

This index can be used to filter out candidate paints whose MI is too large. Also, the computation of the X, Y, Z for the target and candidate paints can be done for a variety of light sources and displayed on the video so that the user can visually judge acceptability of the color difference under different lights. The chips are displayed against a neutral gray background. The X, Y, Z of this background color is also determined for the light source being used. This allows adaptation of the user's vision to the appropriate light conditions.

In an embodiment of the invention, an image of the vehicle to be painted is represented on the video monitor. The chrominance RGB values representing the measured target coating color properties are then projected upon the entire vehicle image, and an available paint formulation can be superimposed thereon, in the area of the vehicle to be repainted. The type or shape of image is not necessarily critical as long as it adequately represents the vehicle in such way as to allow one to minimize any apparent color difference between the target coating and an available best match paint formula. Using this video monitor display technique, the user can select from a variety of available paint formulations to arrive at a best match before preparing and spraying the repair paint.

In another embodiment, when repairing a door, (or any panel for that matter), the user could measure and display color of the ends of the door. Once a best available color paint formulation is chosen, the repair area on the video monitor can be filled in and extended beyond the repair to determine how far the repair should be blended out. The monitor could be "tilted" to judge gonioapparency. A variation of this is the spot repair can be displayed as the alternate color on the spot, surrounded by the car color. Color around the spot may be changed by interpolating between the color of the spot and the surrounding color. This change may be made incrementally until the color change is gradual so as to appear uniform. If the color difference between the repair and surrounding paints is greater, then a larger number of increments will be required. This approach could simulate a blending method. Size of steps at acceptable blend simulation would indicate how far out the blend should go. Cost of repair could also be shown based on the area necessary for an acceptable blended color match.

Embodiments of the present invention may also be effective for fleet vehicle color styling. A video monitor display of an image of vehicle to be painted would allow different parts of the vehicle to be displayed in different colors. Colors could be chosen from those existing in paint suppliers' catalogues or databases, e.g. DuPont SpectraMaster®. In the styling process, the user could also "turn video dials" to control hue, value, chroma, and flop, superimposed on a flake texture and sparkle template. Video phosphor R, G, B signals could be converted to L, a, b and a formula could be determined based on pigment light scattering models (e.g., absorption and scattering data) of available tints. Texture and sparkle information would determine the flake to be used.

Computation would let the user know when color or flop chosen are beyond formula or tint capability. The monitor could be viewed under several simulated light sources to check or control color constancy. This is done by use of a surround that the user chromatically adapts to. Computation allows for individual L, a, b values at each light source. Colors could also be chosen from a ChromaVision® type reading of any standard a user may select. The spectrophotometer would take a reading and the monitor would display the match, thus allowing the customer to view the color on a vehicle. Note that color styling does not generally require accurate absolute color display. If greater accuracy is desired the color accuracy of the video screen can be calibrated using instruments such as an X-Rite spectrophotometer.

The type of computer which can be used in the present invention is not particularly restricted but may for example be a personal computer. The preferred personal computer is one equipped with a CPU having a clock frequency of not less than 166 MHz, an internal memory with a capacity of not less than 16 MB, preferably 32 MB or more, a hard disk unit of not less than 1 GB and a modem, preferably a built-in modem having a communication speed of not less than 28.8 kbps. Moreover, said computer is preferably of low power consumption and small heat generation. Thus, for example, the relevant components used in the notebook-sized portable computer can be utilized.

The type of color monitor display device used in the present invention is not particularly restricted but may be any device which can be connected to a computer and is able to display information in color, for example a cathode ray tube (CRT) or a liquid crystal display (LCD). Use of an LCD contributes to size reduction of the apparatus. Portable personal computers tend to use liquid crystal displays or other flat panel display devices, as opposed to CRT displays. This is because flat panel displays tend to be small and lightweight as compared to CRT displays. In addition, flat panel displays tend to consume less power than comparably sized CRT displays making them better suited for battery powered applications than CRT displays. As the quality of flat panel color displays continues to increase and their cost decreases, flat panel displays are beginning to replace CRT displays in desktop applications. Accordingly, flat panel displays, and LCDs in particular, are becoming ever more common.

As stated above, use of an LCD contributes to size reduction of computers Asuch, many small computing devices with LCD displays can be used, ranging from notebook computers to handheld portable digital assistants (PDAs). In a preferred embodiment, a notebook computer equipped with a LCD display is used.

Moreover, the color monitor in the present invention can be of the touch panel type which facilitates operation of the color matching apparatus of the invention. The touch panel monitor is preferably an ultrasonic scanning type with a glass surface structure which can be easily cleaned of soils and deposits. Incidentally, in the present invention, a touch panel monitor for facilitating the color matching may also be provided independently of the color monitor described herein before.

The above mentioned database has paint formulation information and a color measurement database. Preferably the database is an automotive paint formulation database. This paint formulation database is preferably a database in which master formulations and color data by type of automobile on the market have been entered. The database may reside on the actual computer used, or be accessible from another remote computer or data-server through typical electronic data channels (e.g. internet, ethernet, etc.).

It must be recognized that database structures differ as well as the manner in which each given database searches and stores data. The data described herein need not be stored in separate tables or records, or in any particular form so long as the processes of the computer can achieve the described processes. The processes described herein are non-limiting examples with respect to a standard database structure. The manner of establishing the relationship between data is not as critical as the fact that the relationships are established.

Embodiments of the present invention may be further used in estimating painting materials cost. Paint suppliers usually provide customers with a computer database of formulas to match all car colors they are likely to encounter. A given car color may have more than one alternate formula to allow for the color variation from one car to the next. Suppliers also may provide software to easily search through the database for the correct formula, either based on the color code or multi-angle color measurements of the alternate, also stored in the database. The database may also provides information to estimate the materials cost in terms of paint and other material usage and labor.

When repairing a spot for example on a car door, the refinisher finds the alternate that is the closest match to the rest of that door. If the match is imperfect, the skilled refinisher will spray the repaired spot with sufficient paint film build to hide the substrate color. The repair is then "blended" out beyond the spot itself. This is a process of decreasing the paint film build while moving further away from the repaired spot. Thus the color gradually changes from the (incorrect) color on the spot to the (correct) color of the rest of the door. If this change is gradual enough, human vision does not perceive the mismatch. The larger the color difference between the two colors, the further out the repair must be blended, requiring more paint and more labor.

The repair can be simulated on the video screen with the measured color of the car and the known color of the alternate formula being used. The blending process can also be simulated, lending in steps going further each time beyond the repair spot itself. The user can judge when the blend color is acceptable. The computer can then estimate the amount of paint required for that size repair and the additional labor required.

Various other modifications, alterations, additions or substitutions to the method of this invention will be apparent to those skilled in the art without departing from the spirit and scope of this invention. This invention is not limited by the illustrative embodiments set forth herein, but rather is defined by the following claims.

We claim:

1. A computer-implemented method for determining a color matched repair paint formula, said computer-implemented method comprising:
   a) identifying the color characteristics of a target color to be matched;
   b) inputting and processing said target color characteristics to enable a visual display of said target color;
   c) selecting from a color database, an alternate color, or a plurality of alternate colors, said selection made based upon color characteristics of said target color to be matched;
   d) processing and visually displaying said alternate color, or plurality of alternate colors, to enable comparison with said target color; wherein said target color and said alternate color or plurality of alternate colors are displayed in such a way as to represent more than one viewing angle; and
   e) selecting a desired alternate color and determining the formulation thereof.

2. A computer-implemented method for determining a color matched repair paint formula, said computer-implemented method comprising:
   a) identifying the color characteristics of a target color to be matched;
   b) inputting and processing said target color characteristics to enable a visual display of said target color;
   c) selecting from a color database, an alternate color, or a plurality of alternate colors, said selection made based upon color characteristics of said target color to be matched;
   d) processing and visually displaying said alternate color, or plurality of alternate colors, to enable comparison with said target color; and
   selecting a desired alternate color and determining the formulation further comprising displaying the target color superimposed over an image of a vehicle to be repaired.

3. The method of claim 2 which further comprises displaying an alternate color formulation superimposed over the target color, in the area of the vehicle to be repaired.

4. The method of claim 3 which further comprises selecting a desired alternate color and determining the formulation thereof based upon displaying said alternate color formulation in the area of the vehicle to be repaired.

5. The method of claim 1 wherein said selecting from a color database, an alternate color, or a plurality of alternate colors, is further made on the basis of metamerism, or metamerism index.

6. A computer-implemented method for determining a color matched repair paint formula, said computer-implemented method comprising:
  a) identifying the flake appearance and color characteristics of a target color to be matched;
  b) inputting and processing said target color characteristics to enable a visual display of said target color;
  c) selecting from a color database, an alternate color, or a plurality of alternate colors, said selection made based upon color characteristics of said target color to be matched;
  d) processing and visually displaying said alternate color, or plurality of alternate colors, to enable comparison with said target color;
  e) visually displaying flake appearance options for said alternate color, or plurality of alternate colors; and
  f) selecting a desired alternate color and determining the formulation thereof.

7. The method of claim 6 which further comprises displaying the target color superimposed over an image of a vehicle to be repaired.

8. The method of claim 7 which further comprises displaying an alternate color formulation superimposed over said target color in the area of the vehicle to be repaired.

9. The method of claim 8 which further comprises selecting a desired alternate color and determining the formulation thereof based upon displaying said alternate color formulation in the area of the vehicle to be repaired.

10. The method of claim 6 wherein said alternate color, or plurality of alternate colors, are superimposed over said appearance options.

11. The method of claim 10 wherein said selecting from a color database, an alternate color, or a plurality of alternate colors, is further made on the basis of metamerism, or metamerism index.

12. The methods of claim 1 or claim 6 wherein said color characteristics are identified by measurement with a multi-angle spectrophotometer at a plurality of viewing angles.

13. The methods of claim 1 or claim 6 wherein said target color, said alternate color, or said plurality of alternate colors, are, either individually or severally, visually displayed in several virtual chips.

14. The methods of claim 1 or claim 6 wherein said target color, said alternate color, or said plurality of alternate colors, are, either individually or severally, visually displayed in several virtual chips, wherein each color is segmented into virtual chips simultaneously displaying different viewing angles.

15. The methods of claim 1 or claim 6 wherein said target color, said alternate color, or said plurality of alternate colors, are, either individually or severally, visually displayed in several virtual chips, wherein each virtual chip visually simulates a curved panel simultaneously displaying several viewing angles.

16. The use of the methods of claim 1 or claim 6 to determine a painting materials and labor estimated cost.

\* \* \* \* \*